United States Patent [19]

Eryurek et al.

[11] Patent Number: 6,017,143
[45] Date of Patent: *Jan. 25, 2000

[54] DEVICE IN A PROCESS SYSTEM FOR DETECTING EVENTS

[75] Inventors: Evren Eryurek, Eden Prairie; Jogesh Warrior, Chanhassen, both of Minn.

[73] Assignee: Rosemount Inc., Eden Prairie, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/623,569

[22] Filed: Mar. 28, 1996

[51] Int. Cl.[7] .................................................. G05B 13/02
[52] U.S. Cl. .............................. 364/148.06; 395/183.02; 702/33; 702/182; 706/10; 706/23
[58] Field of Search ................................... 364/148, 164, 364/571, 140.04; 395/3, 183.02; 702/34, 45, 57, 116, 183, 185; 706/10, 23, 46, 52

[56] References Cited

U.S. PATENT DOCUMENTS

| Re. 29,383 | 9/1977 | Gallatin et al. | 137/14 |
|---|---|---|---|
| 3,096,434 | 7/1963 | King | 235/151 |
| 3,404,264 | 10/1968 | Kugler | 235/194 |
| 3,701,280 | 10/1972 | Stroman | 73/861.02 |
| 4,058,975 | 11/1977 | Gilbert et al. | 60/39.281 |
| 4,099,413 | 7/1978 | Ohte et al. | 73/359 |
| 4,337,516 | 6/1982 | Murphy et al. | 702/183 |
| 4,517,468 | 5/1985 | Kemper et al. | 290/52 |
| 4,530,234 | 7/1985 | Cullick et al. | 73/19.02 |
| 4,635,214 | 1/1987 | Kasai et al. | 702/183 |
| 4,642,782 | 2/1987 | Kemper et al. | 364/550 |
| 4,644,479 | 2/1987 | Kemper et al. | 364/550 |
| 4,649,515 | 3/1987 | Thompson et al. | 364/900 |
| 4,707,796 | 11/1987 | Calabro | 702/34 |
| 4,777,585 | 10/1988 | Kokawa et al. | 706/52 |
| 4,831,564 | 5/1989 | Suga | 702/34 |
| 4,873,655 | 10/1989 | Kondraske | 702/86 |
| 4,907,167 | 3/1990 | Skeirik | 364/139 |
| 4,924,418 | 5/1990 | Bachman et al. | 364/550 |
| 4,934,196 | 6/1990 | Romano | 73/861.356 |
| 4,964,125 | 10/1990 | Kim | 371/15.1 |
| 4,992,965 | 2/1991 | Hölter et al. | 701/36 |
| 5,005,142 | 4/1991 | Lipchak et al. | 702/183 |
| 5,043,862 | 8/1991 | Takahashi et al. | 364/162 |
| 5,053,815 | 10/1991 | Wendell | 399/10 |
| 5,081,598 | 1/1992 | Bellows et al. | 364/550 |

(List continued on next page.)

FOREIGN PATENT DOCUMENTS

| 0 122 622 A1 | 10/1984 | European Pat. Off. . |
|---|---|---|
| 0 413 814 A1 | 2/1991 | European Pat. Off. . |
| 0 487 419 A2 | 5/1992 | European Pat. Off. . |

(List continued on next page.)

OTHER PUBLICATIONS

"On–Line Statistical Process Control for a Glass Tank Ingredient Scale," by R.A. Weisman, *IFAC real Time Programming*, 1985, pp. 29–38.

"The Performance of Control Charts for Monitoring Process Variation," by C. Lowry et al., *COMMUN. STATIS.— SIMULA.*, 1995, pp. 409–437.

"A Knowledge–Based Approach for Detection and Diagnosis of Out–Of–Control Events in Manufacturing Processes," by P. Love et al., *IEEE*, 1989, pp. 736–741.

(List continued on next page.)

*Primary Examiner*—William Grant
*Assistant Examiner*—Sheela S Rao
*Attorney, Agent, or Firm*—Westman, Champlin & Kelly, P.A.

[57] ABSTRACT

A process device couples to a process control loop. The process device receives process signals. A memory in the process device contains a nominal parameter value and a rule. Computing circuitry calculates a statistical parameter of the process signal and operates on the statistical parameter and the stored nominal value based upon the stored rule and responsively provides an event output based upon the operation. Output circuitry provides an output in response to the event output.

65 Claims, 6 Drawing Sheets

U.S. PATENT DOCUMENTS

| | | | |
|---|---|---|---|
| 5,089,984 | 2/1992 | Struger et al. ............................ | 395/650 |
| 5,098,197 | 3/1992 | Shepard et al. ......................... | 374/120 |
| 5,099,436 | 3/1992 | McCown et al. ........................ | 364/550 |
| 5,103,409 | 4/1992 | Shimizu et al. ......................... | 364/556 |
| 5,111,531 | 5/1992 | Grayson et al. ........................... | 706/23 |
| 5,121,467 | 6/1992 | Skeirik .................................... | 706/10 |
| 5,122,976 | 6/1992 | Bellows et al. .......................... | 702/185 |
| 5,130,936 | 7/1992 | Sheppard et al. ................... | 364/551.01 |
| 5,134,574 | 7/1992 | Beaverstock et al. .............. | 364/551.01 |
| 5,142,612 | 8/1992 | Skeirik .................................... | 706/23 |
| 5,148,378 | 9/1992 | Shibayama et al. .................... | 702/116 |
| 5,167,009 | 11/1992 | Skeirik .................................... | 706/23 |
| 5,175,678 | 12/1992 | Frerichs et al. ....................... | 364/148.02 |
| 5,193,143 | 3/1993 | Kaemmerer et al. ...................... | 395/51 |
| 5,197,114 | 3/1993 | Skeirik .................................... | 706/23 |
| 5,197,328 | 3/1993 | Fitzgerald ............................... | 73/168 |
| 5,212,765 | 5/1993 | Skeirik .................................... | 417/44.2 |
| 5,214,582 | 5/1993 | Gray ........................................ | 701/33 |
| 5,224,203 | 6/1993 | Skeirik .................................... | 706/23 |
| 5,228,780 | 7/1993 | Shepard et al. .......................... | 374/175 |
| 5,235,527 | 8/1993 | Ogawa et al. ........................... | 702/116 |
| 5,265,031 | 11/1993 | Malczewski ............................. | 364/497 |
| 5,265,222 | 11/1993 | Nishiya et al. ............................ | 395/3 |
| 5,274,572 | 12/1993 | O'Neill et al. ............................ | 702/57 |
| 5,282,131 | 1/1994 | Rudd et al. .............................. | 364/164 |
| 5,282,261 | 1/1994 | Skeirik .................................... | 706/23 |
| 5,293,585 | 3/1994 | Morita ...................................... | 395/52 |
| 5,303,181 | 4/1994 | Stockton .................................. | 365/96 |
| 5,305,230 | 4/1994 | Matsumoto et al. ............... | 364/528.22 |
| 5,311,421 | 5/1994 | Nomura et al. .......................... | 364/157 |
| 5,317,520 | 5/1994 | Castle ....................................... | 702/58 |
| 5,327,357 | 7/1994 | Feinstein et al. .................... | 364/528.06 |
| 5,333,240 | 7/1994 | Matsumoto et al. ..................... | 706/20 |
| 5,349,541 | 9/1994 | Alexandro, Jr. et al. ............... | 364/578 |
| 5,357,449 | 10/1994 | Oh ........................................... | 702/188 |
| 5,361,628 | 11/1994 | Marko et al. ............................. | 73/116 |
| 5,365,423 | 11/1994 | Chand ...................................... | 364/141 |
| 5,367,612 | 11/1994 | Bozich et al. ............................ | 706/23 |
| 5,384,699 | 1/1995 | Levy et al. .......................... | 250/363.03 |
| 5,386,373 | 1/1995 | Keeler et al. ............................. | 364/577 |
| 5,394,341 | 2/1995 | Kepner ..................................... | 702/183 |
| 5,394,543 | 2/1995 | Hill et al. ............................. | 395/183.02 |
| 5,404,064 | 4/1995 | Mermelstein et al. ................... | 310/319 |
| 5,408,406 | 4/1995 | Mathur et al. ........................... | 364/165 |
| 5,408,586 | 4/1995 | Skeirik .................................... | 706/25 |
| 5,414,645 | 5/1995 | Hirano ..................................... | 702/185 |
| 5,419,197 | 5/1995 | Ogi et al. .................................. | 73/659 |
| 5,430,642 | 7/1995 | Nakajima et al. .................. | 364/148.05 |
| 5,440,478 | 8/1995 | Fisher et al. ........................ | 364/468.16 |
| 5,467,355 | 11/1995 | Umeda et al. ....................... | 364/571.04 |
| 5,469,735 | 11/1995 | Watanabe ................................ | 73/118.1 |
| 5,483,387 | 1/1996 | Bauhahn et al. ......................... | 359/885 |
| 5,485,753 | 1/1996 | Burns et al. .............................. | 73/720 |
| 5,486,996 | 1/1996 | Samad et al. ............................ | 364/152 |
| 5,488,697 | 1/1996 | Kaemmerer et al. ...................... | 706/46 |
| 5,489,831 | 2/1996 | Harris ....................................... | 318/701 |
| 5,511,004 | 4/1996 | Dubost et al. ....................... | 364/551.01 |
| 5,548,528 | 8/1996 | Keeler et al. ............................. | 364/497 |
| 5,561,599 | 10/1996 | Lu ............................................ | 364/164 |
| 5,570,300 | 10/1996 | Henry et al. .............................. | 702/45 |
| 5,572,420 | 11/1996 | Lu ............................................ | 364/153 |
| 5,598,521 | 1/1997 | Kilgore et al. ........................... | 345/326 |
| 5,600,148 | 2/1997 | Cole et al. ............................ | 250/495.1 |
| 5,640,491 | 6/1997 | Bhat et al. ................................ | 395/22 |
| 5,671,335 | 9/1997 | Davis et al. .............................. | 395/23 |
| 5,675,504 | 10/1997 | Serodes et al. .......................... | 364/496 |
| 5,704,011 | 12/1997 | Hansen et al. ........................... | 395/22 |
| 5,781,878 | 7/1998 | Mizoguchi et al. ..................... | 701/109 |
| 5,924,086 | 7/1999 | Mathur et al. ............................ | 706/25 |

FOREIGN PATENT DOCUMENTS

| | | |
|---|---|---|
| 0 594 227 A1 | 4/1994 | European Pat. Off. . |
| 0 624 847 A1 | 11/1994 | European Pat. Off. . |
| 0 644 470 A2 | 3/1995 | European Pat. Off. . |
| 2 334 827 | 7/1977 | France . |
| 35 40 204 C1 | 9/1986 | Germany . |
| 40 08 560 A1 | 9/1990 | Germany . |
| 44 33 593 A1 | 6/1995 | Germany . |
| 195 02 499 A1 | 8/1996 | Germany . |
| 58-129316 | 8/1983 | Japan . |
| 59-116811 | 7/1984 | Japan . |
| 59-211196 | 11/1984 | Japan . |
| 59-211896 | 11/1984 | Japan . |
| 60-507 | 1/1985 | Japan . |
| 60-76619 | 5/1985 | Japan . |
| 60-131495 | 7/1985 | Japan . |
| 62-30915 | 2/1987 | Japan . |
| 64-1914 | 1/1989 | Japan . |
| 64001914 | 1/1989 | Japan . |
| 64-72699 | 3/1989 | Japan . |
| 2-5105 | 1/1990 | Japan . |
| 5-122768 | 5/1993 | Japan . |
| 6-19729 | 3/1994 | Japan . |
| 06-242192 | 9/1994 | Japan . |
| 7-63586 | 3/1995 | Japan . |
| 07-234988 | 9/1995 | Japan . |
| 8-54923 | 2/1996 | Japan . |
| 8-136386 | 5/1996 | Japan . |
| 8-166309 | 6/1996 | Japan . |
| 928704 | 6/1963 | United Kingdom . |
| WO 94/25933 | 11/1994 | WIPO . |
| WO 97/21157 | 6/1997 | WIPO . |

OTHER PUBLICATIONS

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310–1314.

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284–L286.

"Detecting Blockage in Process Connections of Differential Pressure Transmitters", by E. Taya et al., *SICE*, 1995, pp. 1605–1608.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29—Aug. 1, 1996, pp. 50–1–50–6.

"Field–based Architecture is Based on Open Systems, Improves Plant Performance", by P. Cleaveland, *I&CS*, Aug. 1996, pp. 73–74.

"Programmable Hardware Architectures for Sensor Validation", by M.P. Henry et al., *Control Eng. Practice*, vol. 4, No. 10, pp. 1339–1354, (1996).

"Development of a Resistance Thermometer For Use Up to 1600°C", by M.J. de Groot et al., *CAL LAB*, Jul./Aug. 1996, pp. 38–41.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244–246.

"A New Method of Johnson Noise Thermometry", by C.J. Borkowski et al., *Rev. Sci. Instrum.*, vol. 45, No. 2, (Feb. 1974) pp. 151–162.

"Taking Full Advantage of Smart Transmitter Technology Now," by G. Orrison, *Control Engineering*, vol. 42, No. 1, Jan. 1995.

"Keynote Paper: Hardware Compilation–A New Technique for Rapid Prototyping of Digital Systems–Applied to Sensor Validation", by M.P. Henry, *Control Eng. Practice*, vol. 3, No. 7, pp. 907–924, (1995).

P. Frank et al., *Fuzzy Logic and Neural Network Applications to Fault Diagnosis*, 16 International Journal of Approximate Reasoning, pp. 67–88 (1997).

"A Decade of Progress in High Temperature Johnson Noise Thermometry," *American Institute of Physic*, by T.V. Blalock and R.L. Shepard, 1982 pp. 1219–1223.

"An Integrated Architecture For Signal Validation in Power Plants," *Third IEEE International Symposium on Intelligent Control*, Aug. 24–28, 1988, pp. 1–6.

"Application of Neural Computing Paradigms for Signal Validation," *Department of Nuclear Engineering*, by B.R. Upadhyaya, E. Eryurek and G. Mathai, pp. 1–18.

"Application of Johnson Noise Thermometry to Space Nuclear Reactors," *Presented at the 6th Symposium on Space Nuclear Power Systems*, by M.J. Roberts, T.V. Blalock and R.L. Shepard, Jan. 9–12, 1989.

"Automated Generation of Nonlinear System Characterization for Sensor Failure Detection," *ISA*, by B.R. Upadhyaya et al., 1989 pp. 269–274.

"Development of a Long–Life, High–Reliability Remotely Operated Johnson Noise Thermometer," *ISA*, by R.L. Shepard et al., 1991, pp. 77–84.

"Development and Application of Neural Network Algorithms For Process Diagnostics," *Proceedings of the 29th Conference on Decision and Control*, by B.R. Upadhyaya et al., 1990, pp. 3277–3282.

"Fuzzy Logic and Artificial Neural Networks for Nuclear Power Plant Applications," *Proceedings of the American Power Conference*, R.C. Berkan et al.

"Software–Based Fault–Tolerant Control Design for Improved Power Plant Operation," *IEEE/IFAC Joint Symposium on Computer–Aided Control System Design*, by E. Eryurek et al., Mar. 7–9, 1994 pp. 585–590.

"In Situ Calibration of Nuclear Plant Platinum Resistance Thermometers Using Johnson Noise Methods," *EPRI*, Jun. 1993.

"Integration of Multiple Signal Validation Modules for Sensor Monitoring," *Department of Nuclear Engineering*, by B. Upadhyaya et al. Jul. 8, 1990 pp. 1–6.

"Johnson Noise Power Thermometer and its Application in Process Temperature Measurement," *American Institute of Physics* by T.V. Blalock et al., 1982, pp. 1249–1259.

"Johnson Noise Thermometer for High Radiation and High–Temperature Environments," *Fifth Symposium*, by L. Oakes et al., Jan. 1988, pp. 2–23.

"Neural Networks for Sensor Validation and Plant Monitoring," *International Fast Reactor Safety Meeting*, by B. Upadhyaya, Aug. 12016, 1990, pp. 2–10.

"Neural Networks for Sensor Validation and Plantwide Monitoring," by E. Eryurek, Jan./Feb. 1992.

"Noise Thermometry for Industrial and Metrological Application at KFA Julich," *7th International Symposium on Temperature*, by H. Brixy et al. 1992.

"Application of Neural Networks for Sensor Validation and Plant Monitoring," *Nuclear Technology*, by B. Upadhyaya, vol. 97, Feb. 1992 pp. 170–176.

Parallel, Fault–Tolerant Control and Diagnostics System for Feedwater Regulation in PWRS, *Proceedings of the American Power Conference*, by E. Eryurek et al.

"Sensor Validation for Power Plants Using Adaptive Backpropagation Neural Network," *IEEE Transactions on Nuclear Science*, vol. 37, No. 2, by E. Eryurek et al. Apr. 1990, pp. 1040–1047.

"Survey, Applications, And Prospects of Johnson Noise Thermometry," *Electrical Engineering Department*, by T. Blalock et al. 1981.

"Tuned Circuit Dual–Mode Johnson Noise Thermometers," by R.L. Shepard, 1992.

"Tuned–Circuit Johnson Noise Thermometry," *7th Symposium on Space Nuclear Power Systems*, by Michael Roberts et al., Jan. 1990.

"Using Artificial Neural Networks to Identify Nuclear Power Plant States," by Israel E. Alguindigue et al., pp. 1–4.

"Wavelet Analysis of Vibration, Part I: Theory[1]," *Journal of Vibration and Acoustics*, by D.E. Newland, vol. 116, Oct. 1994, pp. 409–416.

"Wavelet Analysis of Vibration, Part 2: Wavelet Maps," *Journal of Vibration and Acoustics*, by D.E. Newland, vol. 116, Oct. 1994, pp. 417–425.

Smart Field Devices Provide New Process Data, Increase System Flexibility, *I&CS*, by Mark Boland, Nov. 1994, pp. 45–51.

"Keynote Paper: Hardware Compilation–A New Technique for Rapid Prototyping of Digital Systems–Applied to Sensor Validation", *Control Eng. Practice*, by M.P. Henry, vol. 3, No. 7., pp. 907–924, (1995).

"Programmable Hardware Architectures for Sensor Validation", *Control Eng. Practice*, by M.P. Henry et al., vol. 4, No. 10., pp. 1339–1354, (1996).

"In Situ Response Time Testing of Thermocouples", *ISA Transactions*, by H.M. Hashemian et al., vol. 29, No. 4, pp. 97–104, (1990).

"Detecting Blockage in Process Connections of Differential Pressure Transmitters", *SICE*, by Eija Taya et al., pp. 1605–1608, (Jul. 26–28, 1995).

"Intelligent Behaviour for Self–Validating Sensors", *Advances In Measurement*, by M.P. Henry, pp. 1–7, (May 1990).

A Standard Interface for Self–Validating Sensors, *Report No. QUEL 1884/91*, by M.P. Henry et al., (1991).

"The Implications of Digital Communications on Sensor Validation", *Report No. QUEL 1912/92*, by M. Henry et al., (1992).

"Signal Processing, Data Handling and Communications: The Case for Measurement Validation", by M.P. Henry, Department of Engineering Science, Oxford University.

"Smart Temperature Measurement in the '90s", *C&I*, by T. Kerlin et al., (1990).

"In–Situ Response Time Testing of Thermocouples", *ISA*, by H.M. Hashemian et al., Paper No. 89–0056, pp. 587–593, (1989).

"A Fault–Tolerant Interface for Self–Validating Sensors", *IEE Colloquium*, by M.P. Henry, pp. 3/1–3/2, Digest No. 1990/145.

"On–Line Statistical Process Control for a Glass Tank Ingredient Scale," by R.A. Weisman, *IFAC real Time Programming*, 1985, pp. 29–38.

"The Performance of Control Charts for Monitoring Process Variation," by C. Lowry et al., *Commun. Statis.—Simula.*, 1995, pp. 409–437.

"A Knowledge–Based Approach for Detection and Diagnosis of Out–Of–Control Events in Manufacturing Processes," by P. Love et al., *IEEE*, 1989, pp. 736–741.

DEVICE IN A PROCESS SYSTEM FOR DETECTING EVENTS

BACKGROUND OF THE INVENTION

The present invention relates to devices which couple to process control loops of the type used in industry. More specifically, the invention relates to detection of events in a process control system by monitoring process signals.

Process control loops are used in industry to control operation of a process, such as an oil refinery. A transmitter is typically part of the loop and is located in the field to measure and transmit a process variable such as pressure, flow or temperature, for example, to control room equipment. A controller such as a valve controller is also part of the process control loop and controls position of a valve based upon a control signal received over the control loop or generated internally. Other controllers control electric motors or solenoids for example. The control room equipment is also part of the process control loop such that an operator or computer in the control room is capable of monitoring the process based upon process variables received from transmitters in the field and responsively controlling the process by sending control signals to the appropriate control devices. Another process device which may be part of a control loop is a portable communicator which is capable of monitoring and transmitting process signals on the process control loop. Typically, these are used to configure devices which form the loop.

It is desirable to detect the occurrence of an event in the process control system. Typically, the prior art has been limited to a simple detection techniques. For example, process variable such as pressure is monitored and an alarm is sounded or a safety shutdown is initiated if the process variable exceeds predefined limits. However, in order to identify what event triggered the alarm, it is necessary to use complex models which are difficult to implement in a process environment where there is limited power and resources for large computations.

SUMMARY OF THE INVENTION

A device in a process control system includes an input which receives a process signal. The device includes memory containing nominal parameter values and rules. In one embodiment, a nominal parameter value relates to trained value(s) of the process signal and sensitivity parameter(s). Computing circuitry in the device calculates statistical parameters of the process signal and operates on the statistical parameters and the stored nominal parameter values based upon the stored rules. The computing circuitry provides an event output related to an event in the process control system based upon the evaluation of the rules. Output circuitry provides an output in response to the event output. In one embodiment, the statistical parameters are selected from the group consisting of standard deviation, mean, sample variance, range, root-mean-square, and rate of change. In one embodiment the rules are selected to detect events from the group consisting of signal spike, signal drift, signal bias, signal noise, signal stuck, signal hard over, cyclic signal, erratic signal and non-linear signal.

The device of the present invention includes any process device such as a transmitter, controller, motor, sensor, valve, communicator, or control room equipment.

DETAILED DESCRIPTION OF THE PREFERRED EMBODIMENTS

Process variables are typically the primary variables which are being controlled in a process. As used herein, process variable means any variable which describes the condition of the process such as, for example, pressure, flow, temperature, product level, pH, turbidity, vibration, position, motor current, any other characteristic of the process, etc. Control signal means any signal (other than a process variable) which is used to control the process. For example, control signal means a desired process variable value (i.e. a setpoint) such as a desired temperature, pressure, flow, product level, pH or turbidity, etc., which is adjusted by a controller or used to control the process. Additionally, a control signal means, calibration values, alarms, alarm conditions, the signal which is provided to a control element such as a valve position signal which is provided to a valve actuator, an energy level which is provided to a heating element, a solenoid on/off signal, etc., or any other signal which relates to control of the process. A diagnostic signal as used herein includes information related to operation of devices and elements in the process control loop, but does not include process variables or control signals. For example, diagnostic signals include valve stem position, applied torque or force, actuator pressure, pressure of a pressurized gas used to actuate a valve, electrical voltage, current, power, resistance, capacitance, inductance, device temperature, stiction, friction, full on and off positions, travel, frequency, amplitude, spectrum and spectral components, stiffness, electric or magnetic field strength, duration, intensity, motion, electric motor back emf, motor current, loop related parameters (such as control loop resistance, voltage, or current), or any other parameter which may be detected or measured in the system. Furthermore, process signal means any signal which is related to the process or element in the process such as, for example, a process variable, a control signal or a diagnostic signal. Process devices include any device which forms part of or couples to a process control loop and is used in the control or monitoring of a process.

Figure 1:
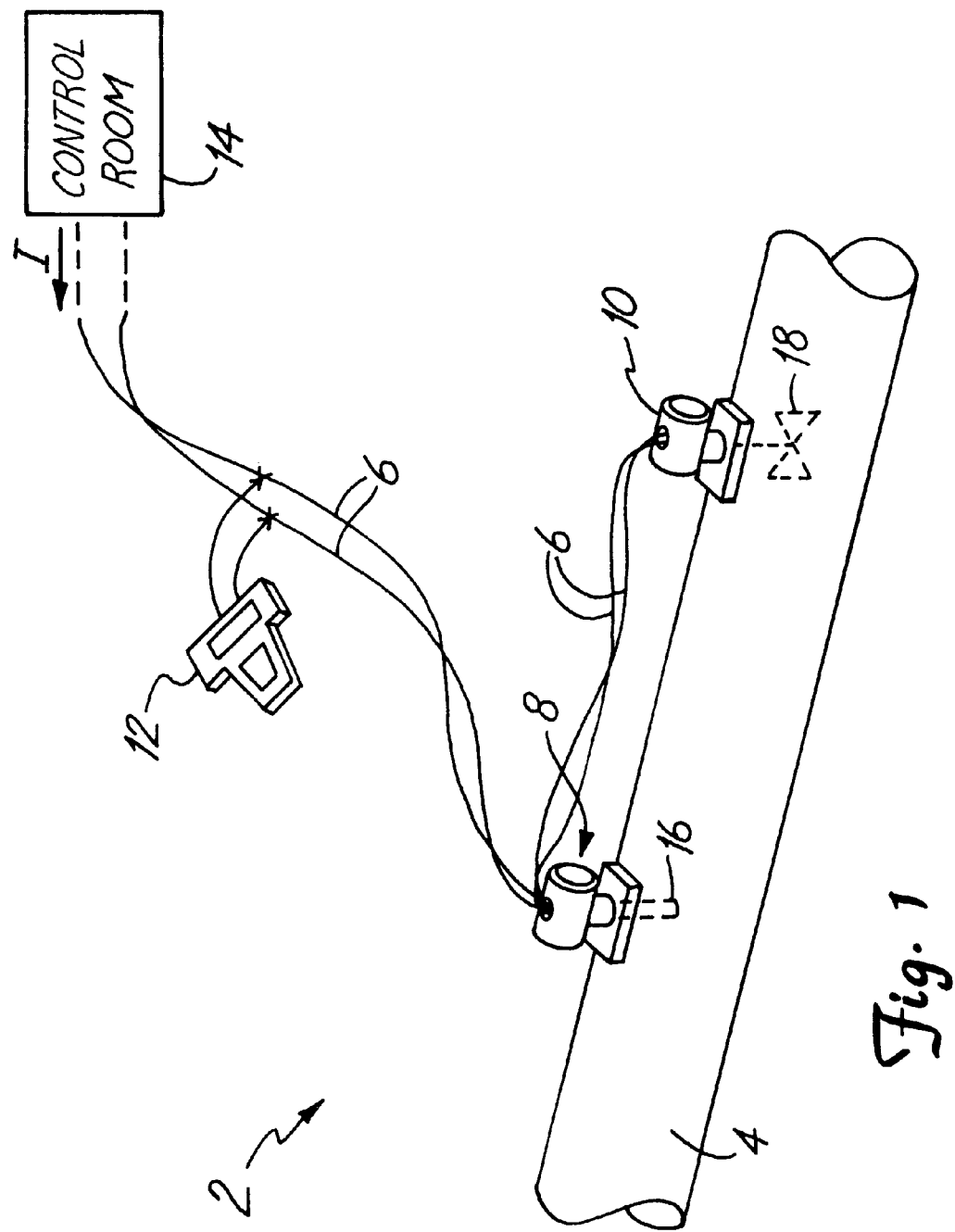
FIG. 1 is a simplified diagram showing a process control loop including a transmitter, controller, hand-held communicator and control room.

FIG. 1 is a diagram showing an example of a process control system 2 which includes process piping 4 which carries a process fluid and two wire process control loop 6 carrying loop current I. A transmitter 8, controller 10, which couples to a final control element in the Loop such as an actuator, valve, a pump, motor or solenoid, communicator 12, and control room 14 are all part of process control loop 6. It is understood that loop 6 is shown in one configuration and any appropriate process control loop may be used such as a 4–20 mA loop, 2, 3 or 4 wire loop, multi-drop loop and a loop operating in accordance with the HART®, Fieldbus or other digital or analog communication protocol. In operation, transmitter 8 senses a process variable such as flow using sensor 16 and transmits the sensed process variable over loop 6. The process variable may be received by controller/valve actuator 10, communicator 12 and/or control room equipment 14. Controller 10 is shown coupled to valve 18 and is capable of controlling the process by adjusting valve 18 thereby changing the flow in pipe 4. Controller 10 receives a control input over loop 6 from, for example, control room 14, transmitter 8 or communicator 12 and responsively adjusts valve 18. In another embodiment, controller 10 internally generates the control signal based upon process signals received over loop 6. Communicator 12 may be the portable communicator shown in FIG. 1 or may be a permanently mounted process unit which monitors the process and performs computations. Process devices include, for example, transmitter 8 (such as a 3095 transmitter available from Rosemount Inc.), controller 10, communicator 12 and control room 14 shown in FIG. 1. Another type of process device is a PC, programmable logic unit (PLC) or other computer coupled to the loop using appropriate I/O circuitry to allow monitoring, managing, and/or transmitting on the loop.

Figure 2:
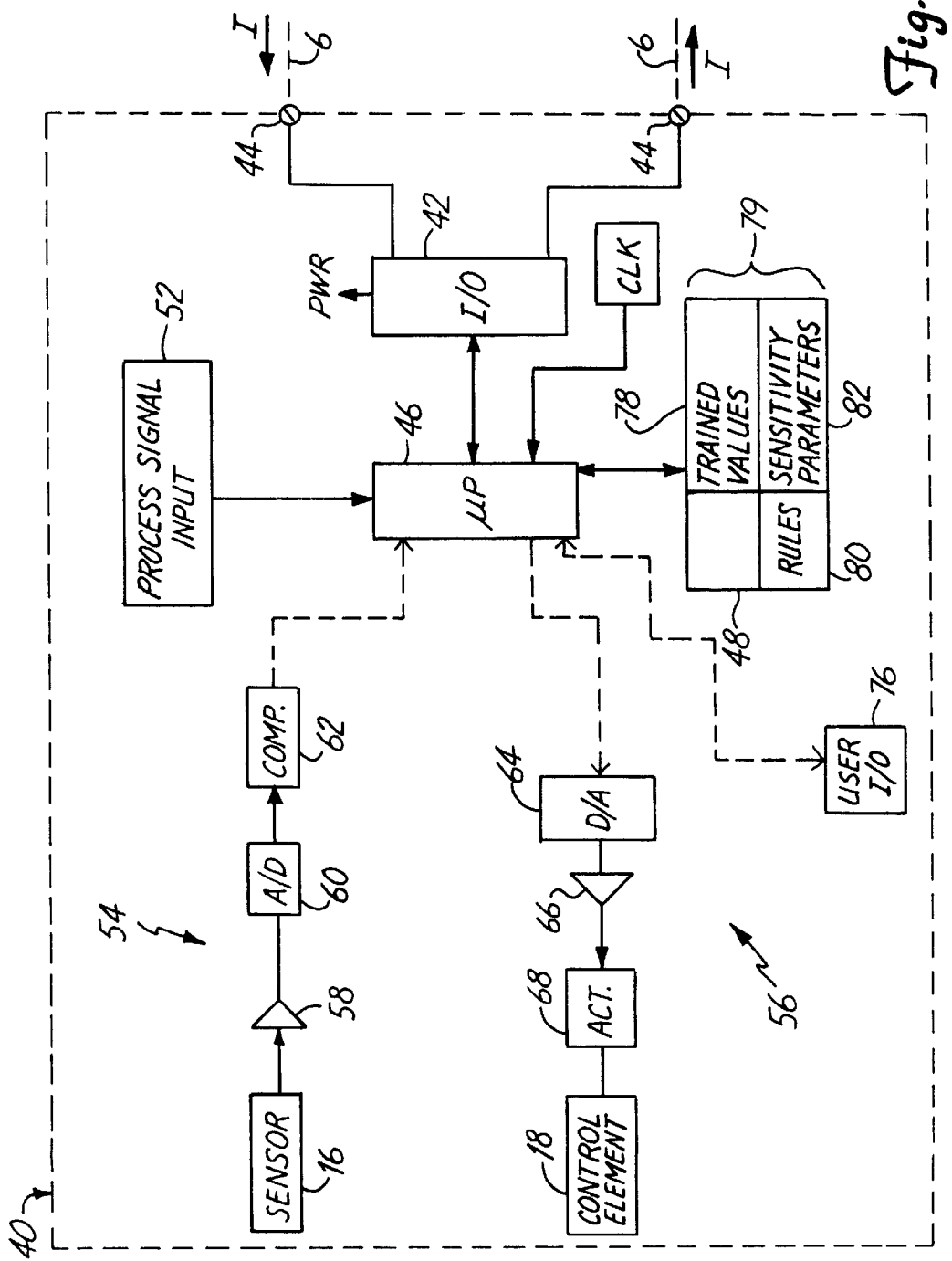
FIG. 2 is a block diagram of a process device in accordance with the present invention.

Any of the process devices 8, 10, 12 or 14 shown in FIG. 1 may include event monitoring circuitry in accordance with the present invention. FIG. 2 is a block diagram of a process device 40 forming part of loop 6. Device 40 is shown generically and may comprise any process device such as transmitter 8, controller 10, communicator 12 or control room equipment 14. Control room equipment 14 may comprise, for example, a DCS system implemented with a PLC and controller 10 may also comprise a "smart" motor and pump. Process device 40 includes I/O circuitry 42 coupled to loop 6 at terminals 44. I/O circuitry has preselected input and output impedance known in the art to facilitate appropriate communication from and to device 40. Device 40 includes microprocessor 46, coupled to I/O circuitry 42, memory 48 coupled to microprocessor 46 and clock 50 coupled to microprocessor 46. Microprocessor 46 receives a process signal input 52. Block input is intended to signify input of any process signal, and as explained above, the process signal input may be a process variable, or a control signal and may be received from loop 6 using I/O circuitry 42 or may be generated internally within field device 40. Field device 40 is shown with a sensor input channel 54 and a control channel 56. Typically, a transmitter such as transmitter 8 will exclusively include sensor input channel 54 while a controller such as controller 10 will exclusively include a control channel 56. Other devices on loop 6 such as communicator 12 and control room equipment 14 may not include channels 54 and 56. It is understood that device 40 may contain a plurality of channels to monitor a plurality of process variables and/or control a plurality of control elements as appropriate.

Sensor input channel 54 includes sensor 16, sensing a process variable and providing a sensor output to amplifier 58 which has an output which is digitized by analog to digital converter 60. Channel 54 is typically used in transmitters such as transmitter 8. Compensation circuitry 62 compensates the digitized signal and provides a digitized process variable signal to microprocessor 46. In one embodiment, channel 54 comprises a diagnostic channel which receives a diagnostic signal.

When process device 40 operates as a controller such as controller 8, device 40 includes control channel 56 having control element 18 such as a valve, for example. Control element 18 is coupled to microprocessor 46 through digital to analog converter 64, amplifier 66 and actuator 68. Digital to analog converter 64 digitizes a command output from microprocessor 46 which is amplified by amplifier 66. Actuator 68 controls the control element 18 based upon the output from amplifier 66. In one embodiment, actuator 68 is coupled directly to loop 6 and controls a source of pressurized gas (not shown) to position control element 18 in response to the current I flowing through loop 6. In one embodiment, controller 10 includes control channel 56 to control a control element and also includes sensor input channel 54 which provides a diagnostic signal such as valve stem position, force, torque, actuator pressure, pressure of a source of pressurized air, etc.

In one embodiment, I/O circuitry 42 provides a power output used to completely power other circuitry in process device 40 using power received from loop 6. Typically, field devices such as transmitter 8, or controller 10 are powered off the loop 6 while communicator 12 or control room 14 has a separate power source. As described above, process signal input 52 provides a process signal to microprocessor 46. The process signal may be a process variable from sensor 16, the control output provided to control element 18, a diagnostic signal sensed by sensor 16, or a control signal, process variable or diagnostic signal received over loop 6, or a process signal received or generated by some other means such as another I/O channel.

A user I/O circuit 76 is also connected to microprocessor 46 and provides communication between device 40 and a user. Typically, user I/O circuit 76 includes a display and audio for output and a keypad for input. Typically, communicator 12 and control room 14 includes I/O circuit 76 which allows a user to monitor and input process signals such as process variables, control signals (setpoints, calibration values, alarms, alarm conditions, etc.) along with rules, sensitivity parameters and trained values as described below. A user may also use circuit 76 in communicator 12 or control room 14 to send and receive such process signals to transmitter 8 and controller 10 over loop 6. Further, such circuitry could be directly implemented in transmitter 8, controller 10 or any other process device 40.

Figure 3:
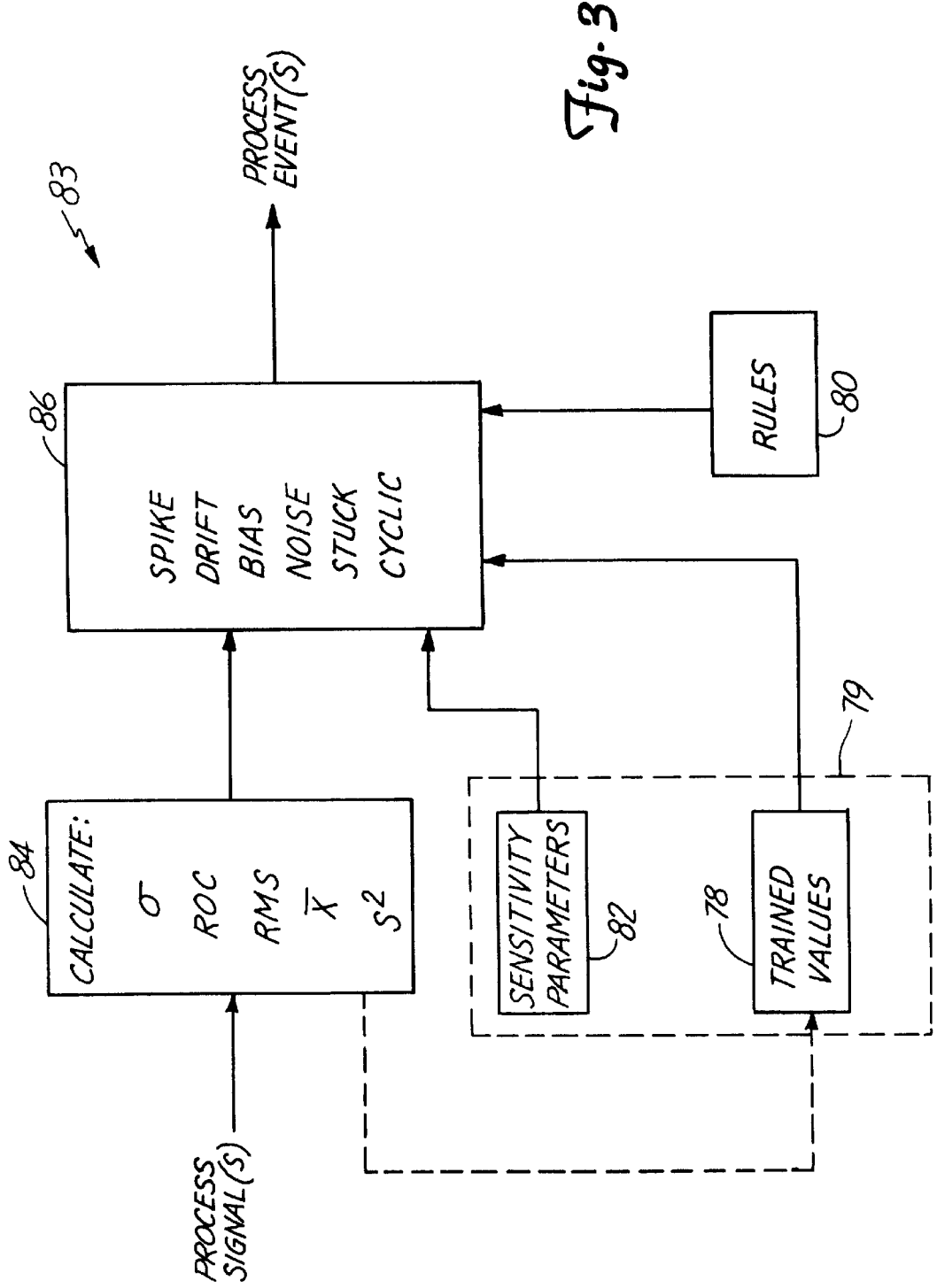
FIG. 3 is a diagram showing application of rules to calculated statistical parameters and sensitivity parameters to provide a process event output.

Microprocessor 46 acts in accordance with instructions stored in memory 48. Memory 48 also contains trained values 78, rules 80 and sensitivity parameters 82 in accordance with the present invention. The combination of the sensitivity parameters 82 and the trained values 78 provide a nominal value 79. FIG. 3 is a block diagram 83 showing a logical implementation of device 40. Logical block 84 receives process signals and calculates statistical parameters for the process signals. These statistical parameters include standard deviation, mean, sample variance, root-mean-square (RMS), range (ΔR) and rate of change (ROC) of the process signal, for example. These are given by the following equations:

$$\text{mean} = \bar{x} = \frac{1}{N}\sum_{i=1}^{N} X_i \quad \text{Eq. 1}$$

$$\text{RMS} = \sqrt{\frac{1}{N}\sum_{i=1}^{N} X_i^2} \quad \text{Eq. 2}$$

$$\sqrt{\sigma} = \sqrt{\text{standard deviation}} = \text{variance} \quad \text{Eq. 3}$$

$$= S^2 = \frac{1}{n-1}\sum_{i=1}^{N}(x_i - \bar{x})^2$$

$$ROC = r_i = \frac{x_i - x_{i-1}}{T} \quad \text{Eq. 4}$$

$$\Delta R = x_{MAX} - x_{MIN} \quad \text{Eq. 5}$$

Where N is the total number of data points in the sample period, $x_i$ and $x_{i-1}$ are two consecutive values of the process signal and T is the time interval between the two values. Further, $X_{MAX}$ and $X_{MIN}$ are the respective maximum and minimum of the process signal over a sampling or training time period. These statistical parameters are calculated alone or in any combination. It will be understood that the invention includes any statistical parameter other than those explicitly set forth which may be implemented to analyze a process signal. The calculated statistical parameter is received by rule calculation block 86 which operates in accordance with rules 80 stored in memory 48. Rules block 86 also receives trained values 78 from memory 48. Trained values are the nominal or (i.e., typical) statistical parameter value for the process signal and comprise the same statistical parameters (standard deviation, mean, sample variance, root-mean-square (RMS), range and rate of change, etc.) used in logical block 84. In one embodiment, the trained values are provided by the manufacturer and stored in memory 48 of transmitter 40 during manufacture. In another embodiment, the trained values are periodically updated by addressing device 40 over loop 6. In still another embodiment, input circuitry 76 may generate or receive the trained values or be used to transmit the trained values to another process device over loop 6. In yet another embodiment, the trained values are generated by statistical parameter logical block 84 which generates, or learns, the nominal or normal statistical parameters during normal operation of the process. These statistical parameters are used to generate the trained values 78 in memory 48 for future use. This allows dynamic adjustment of trained values 78 for each specific loop and operating condition. In this embodiment, statistical parameters 84 are monitored for a user selectable period of time based upon the process dynamic response time.

Rules block 86 receives sensitivity parameters 82 from memory 48. Rules logical block 86 provides examples of a number of different rules. Each sensitivity parameter value 82 provides an acceptable range or relationship as determined by the appropriate rule between the calculated statistical parameters 84 and the appropriate trained values 78. The sensitivity parameter values 82 may be set by the manufacturer, received over loop 6 or input using input circuitry 76. The sensitivity parameters are adjusted for the specific application. For example, in process control applications where high accuracy is required, the sensitivity parameters are set so as to allow only small variations of the process signals relative to the trained values. The use of sensitivity parameters allow the diagnostic and event detection decision making to be controlled based upon the particular process and the requirements of the user.

Figure 4:
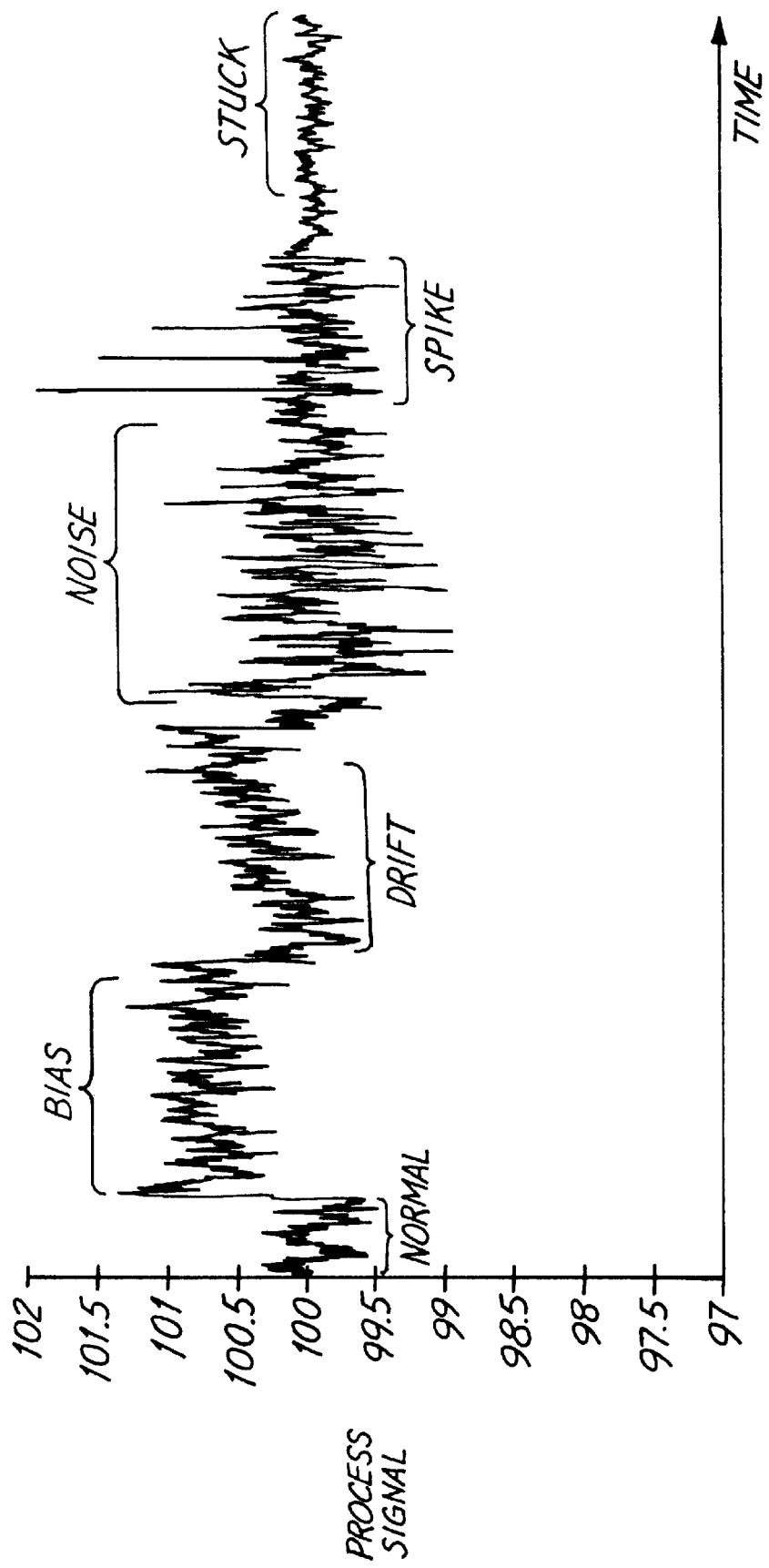
FIG. 4 is a graph of a process signal output versus time showing various types of events.

FIG. 4 is an example of a process signal versus time which shows different process events (e.g. normal, bias, drift, noise, spike and stuck) which are detected using the present invention. The process signal shown in FIG. 4 is initially in a normal state and then moves to a bias condition. Next, the process signal goes through a drift condition followed by a noisy signal condition. Finally, a series of spike events occur in the process signal followed by a stuck condition. The rules used to detect these events are described below.

Drift

Drift occurs when a process signal changes over time from its true (i.e. nominal) value. One embodiment of the invention includes a rule which operates on a statistical parameter mean ($\mu$), the trained parameter mean ($\mu'$) and a tuning parameter alpha ($\alpha$) to detect drift.

Drift sensitivity is controlled by a single sensitivity parameter, alpha ($\alpha$). Alpha ($\alpha$) represents a percentage above or below the normal mean signal level that is tolerable before a drift or event is detected. The following rule performed by rule calculation block 86 detects a drift event:

if $\mu < \mu' (1-\alpha)$ then a negative drift event if $\mu > \mu' (1+\alpha)$ then a positive drift event, where $\mu$ is the current mean of the process signal from 84, $\mu'$ is the trained mean from 78 and $\alpha$ is the sensitivity parameter from 82 which defines the acceptable variations from the mean. Additionally, the mean is monitored over time. A drift event is only detected if, over a series of consecutive sampling period, the mean is moving away from the trained value. The trained mean ($\mu'$) may be learned by training device 40 during normal operation of the process.

Bias

Bias is the result of a temporary drift "stabilizing" at a certain level above or below the expected signal level. Once the drift stops, the resulting signal has a bias, sometimes called an offset from the true/nominal value. A bias is detected using the same rule used for drift. Additionally, the mean is monitored over time. If the mean is not continuing to move away from the trained mean ($\mu'$), then it is determined that the event is bias, not drift.

Noise

A different combination of a rule, tuning parameters and trained values detect noise in the process signal. Noise detection sensitivity is adjusted by adjusting the sensitivity parameter beta ($\beta$). Beta ($\beta$) is the amount the current standard deviation ($\sigma$) can be above the trained standard deviation ($\sigma'$) before detection of a noise event. For example, if the user desires to detect a noise event when the process signal is twice as noisy as the trained value, $\beta$ should be sent to 2.0. Range (ΔR) is also used by the rule to differentiate noise from normal signal variations. An example rule for noise detection is:

if σ>βσ' and if ΔR>ΔR' then noise detected.

Where σ and σ' are the current and trained standard deviation ΔR and ΔR' are the current and trained range, respectively, and β is the noise sensitivity parameter.

Stuck

Yet another combination of a rule, statistical value, tuning parameters and trained values detect a stuck condition in a process signal. A "stuck" process signal is one which a condition of the process signal does not vary with time. Stuck sensitivity is controlled by adjusting the sensitivity parameter 82 gamma (γ). A value for gamma (γ) is expressed as a percentage of the trained standard deviation (σ') and represents how small a change in standard deviation from the trained value triggers detection of a stuck event. For example, if a user wishes to detect a stuck condition when the process signal noise level is half of the trained value, γ should be set equal to 50 percent (0.5). Further, range of the signal (ΔR) can be used to eliminate errors that arise with small signals. One example rule is:

If $(\sigma+\Delta R) \leq \gamma(\sigma'+\Delta R')$ then a stuck event is detected.

Spike

A different combination of a rule, a statistical value, trained value and sensitivity parameter is used to detect a spike event. A spike event occurs when the signal momentarily goes to an extreme value. Sensitivity to spikes in the process signal is controlled by adjusting a sensitivity parameter from δ stored in 82. δ is the acceptable trained maximum rate of change ($\Delta P_{max}$) between two consecutive data points. For example, if the user wishes to detect any spikes that have a rate of change (ROC) from block 84 that is 30% greater than $\Delta r_{max}$ from block 78 relative to the trained value, δ from 82 should be set to 1.30. An example rule is:

if $ROC > \delta \cdot \Delta r_{max}$ then a spike event is detected

Other rules include a cyclic rule to detect cyclical oscillations in the process signal and an erratic rule to detect erratic behavior in the process signal. It should be understood that other rules may be implemented to observe other events in the process signal and may use different formulas or computational techniques to detect an event. A rule may operate on more than one statistical parameter or on more than one process signal. For example, if a process variable such as flow rate exceeds a predetermined limit while another process variable such as process temperature spikes, a rule could determine that the process is overheating and an emergency shut down condition could exist. Furthermore, another type of rule is implemented in fuzzy logic in which the statistical parameter is operated on by a sensitivity parameter which is a membership function applied to the trained values.

All of the rules discussed herein provide a process event output based upon the operation of the rule. It should be understood that the process event output may have a plurality of discrete or continuous values based upon operation of the rule. Note that the combination of the sensitivity parameter and the trained value provides a nominal parameter value and that the rule operates on the nominal parameter value and the statistical parameter. The various process signals, parameters and trained values can be combined using weighted averages or appropriate fuzzy logic. Membership functions include, for example, trapezoidal and triangular functions. For example, the statistical parameter can be mapped onto the chosen membership function. These are then used during training to generate the trained values, and to generate the statistical parameters for use by the rules.

In one embodiment, the trained values are obtained by determining that the process is stable, and generating the statistical parameters for a selectable period of time. These are stored as the trained values. The selectable period of time should be about the same as sampling period or block used to generate the statistical parameters during operation. This process may be user initiated or automated.

The output of a rule can be transmitted over loop 6, output on user I/O circuit 76, stored for future use, used as an input to another computation such as another rule or a control function, or used in any appropriate manner. In another embodiment, the present invention monitors related process signals and performs comparisons and correlations between these signals. For example, in FIG. 2 process signals such as the output of A/D converter 60, compensation circuit 62, and current I through loop 6 can be analyzed in accordance with FIG. 3. For example, the plurality of process signals should all be within a desired tolerance between one another as set forth by the appropriate combination of sensitivity parameters, rules, and trained values.

Figure 5:
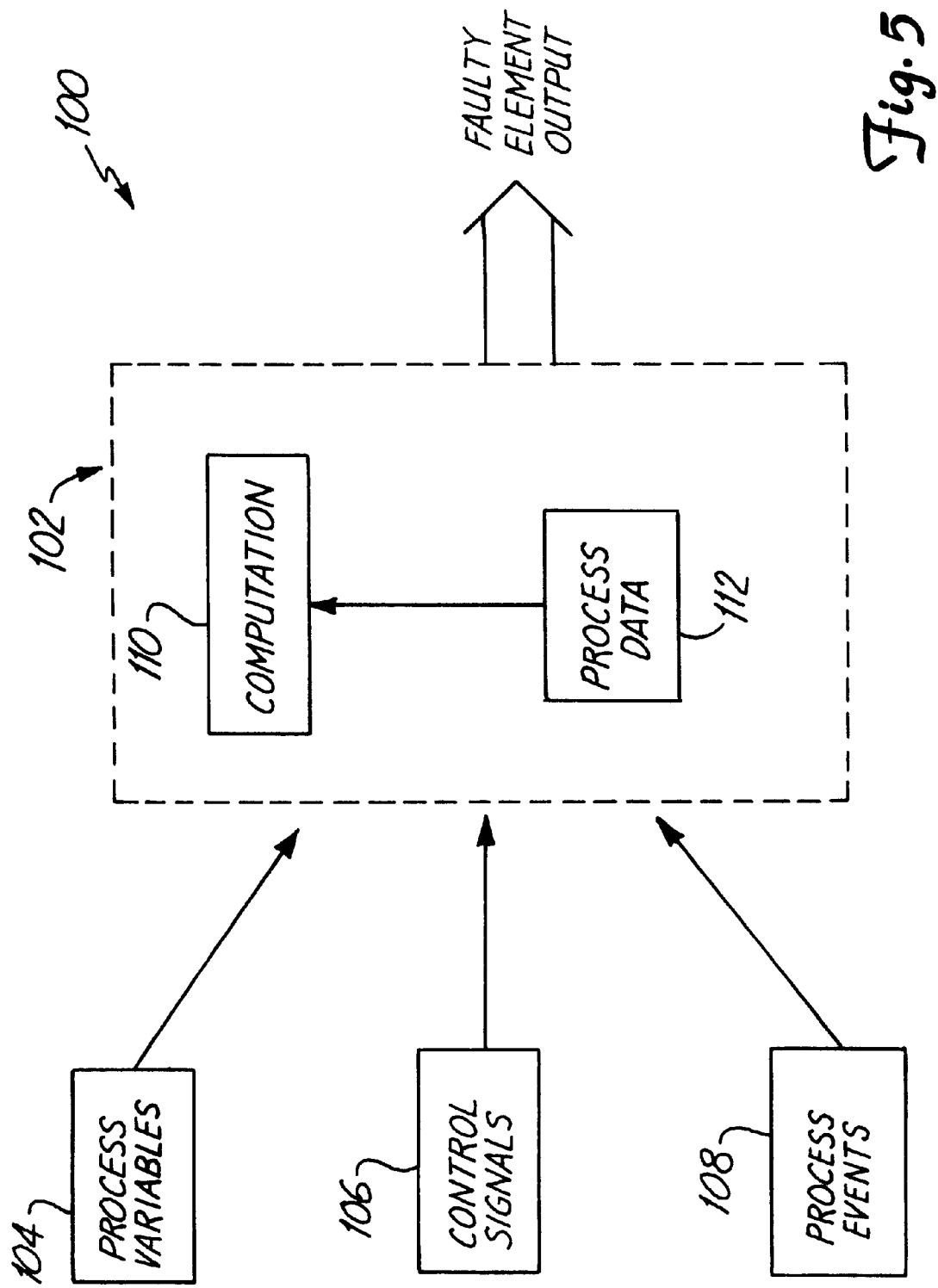
FIG. 5 is a block diagram showing an inference engine operating on process events in accordance with the present invention.

FIG. 5 is a block diagram 100 showing inference engine 102. Inference engine 102 resides in process device 40, is part of loop 6, and receives process variables 104, control signals 106 and process events 108. Process events are detected in accordance with the present invention. Inference engine 102 includes computation circuitry 110 and process data 112. Process data 112 may comprise, for example, process history information such as logged process variables, control signals, process events or other process signals and may contain process specific information which further defines the process being monitored. Upon the occurrence of a process event, the inference engine 102 determines which component in the various process devices is faulty. Computation circuitry 110 analyzes process variables 104, control signals 106, process events 108 and other process signals to determine the cause of the process event. Computation circuitry operates in accordance with a series of rules such as those used in the known technique of an expert system. Computation circuitry 110 operates on all of the inputs including process data 112 and provides a faulty element output such as a warning signal. For example, if a drift event is detected, inference engine 102 operates to determine the cause of the drifts. For example, the drift may be due to a control setpoint which was changed in which case computation circuitry 110 determines that the control loop is operating properly. However, if the setpoint was not changed, the inference engine further analyzes the various inputs and, for example, checks the integrity of the device reporting a process event, such as a valve motor, pump, vibration equipment, etc., by running appropriate diagnostics. If the valve, for example, indicates that the valve is operating properly, the inference engine may then perform transmitter diagnostics to determine if a transmitter and associated sensors are operating properly. These diagnostics may observe information from the specific element being reviewed and may also observe information being received from other sources on the control loop such as upstream or downstream sensors, etc. Computation circuitry 110 uses any appropriate computational technique such a series of rules, fuzzy logic or neural networks. In a preferred embodiment, inference engine is implemented in a microprocessor and memory and may be located in a control room, at some remote location or in the field itself. Inference engine 102 may be implemented in any of the process devices 8, 10, 12 or 14 shown in FIG. 1. The faulty element output can be provided to an operator or can be used by additional computational circuitry which performs further diagnostics on the loop.

Figure 6:
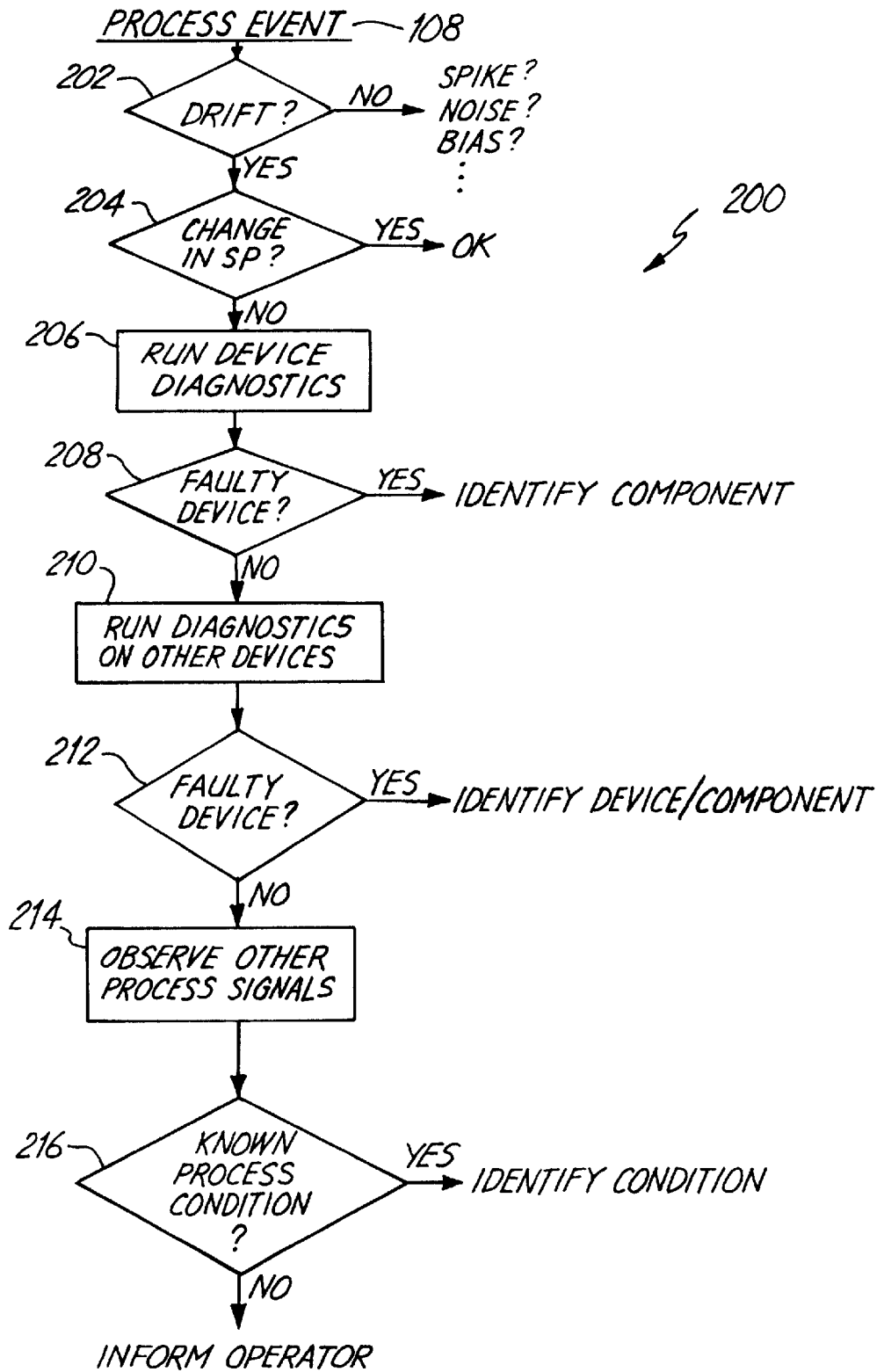
FIG. 6 is a simplified block diagram of an inference engine for use in the present invention.

FIG. 6 shows a block diagram 200 of a simplified, example inference engine such as engine 102 operating in accordance with a rule base. Upon the occurrence of a process event, at block 202 the inference engine 102 examines the process event to identify the specific event which was detected. If the event was a drift event, control moves on to block 204. If the event was some other event such as spike, noise or bias, control moves to a rule base constructed in accordance with the specific event which was detected. At block 204, the inference engine checks to see if the setpoint of the process was recently changed. If the setpoint was recently changed, an output is provided which indicates that the process is operating within its normal range and that the drift which was detected was due to the change in setpoint. However, if the setpoint was not changed, the inference engine moves on to block 206 to run further diagnostics. At block 206, the inference engine instructs process device 40 to run on board diagnostics to further determine the cause of the drift. At block 208, if the diagnostics run by device 40 identify the cause of the drift, the inference engine provides an output identifying a faulty component. However, if the diagnostics indicate that device 40 is operating properly, inference engine instructs related devices to run diagnostics at block 210. For example, related devices may be upstream or downstream, controllers or transmitters. At block 212, the inference engine determines if one of the related process devices is the faulty device. If the fault which caused the drift is one of the related devices, the inference engine provides an output identifying the device and faulty component. If none of the related devices are in error, the inference engine observes other process signals at block 214 in an attempt to identify known process conditions at block 216. If the cause of the drift is due to a known process condition, for example, a fluid pressure drop caused by the filling of a reserve tank with process fluid. If the process condition is known, the specific condition is identified. If the process condition is not known, the operator is informed that a drift event has been detected whose cause cannot be identified. At any point in the flow chart 200, based upon any of the various rules, the inference engine may initiate a shutdown procedure to shut down the process. As discussed above, actual inference engines will contain a much more sophisticated rule base and/or will employ more sophisticated forms of logic such as fuzzy logic and neural networks, specific to each process control application.

Although the present invention has been described with reference to preferred embodiments, workers skilled in the art will recognize that changes may be made in form and detail without departing from the spirit and scope of the invention. For example, all of the various functions and circuitry described herein can be implemented in any appropriate circuitry including software, ASICs, fuzzy logic techniques, or even analog implementations. Further, the process device may include any number or combination of input and control channels and may operate on any number of process signals, alone or in their combination, and the rules may operate accordingly.

What is claimed is:

1. A process device coupled to a process control loop, comprising:

a process signal input providing a process signal related to a process;

memory containing a trained parameter representative of statistical function of an observed process signal and a rule;

computing circuitry calculating a current parameter representative of a statistical function of the process signal and operating on the current parameter and the trained parameter based upon the rule to thereby recognize a pattern in the process signal associated with a failure event and responsively providing a failure event output in response to an event in the process detected based upon the operation; and output circuitry outputting the failure event output.

2. The apparatus of claim 1 wherein the memory further contains a sensitivity parameter and the failure event output is formed or based upon the sensitivity parameter.

3. The apparatus of claim 1 wherein the process control loop is selected from the group consisting of two wire process control loops, three wire process control loops and four wire process control loops.

4. The apparatus of claim 1 wherein the device is completely powered with power received from the process control loop.

5. The apparatus of claim 1 wherein the statistical function is selected from the group consisting of standard deviation, mean, sample variance, root-mean-square (RMS), range, and rate of change.

6. The apparatus of claim 1 wherein the computing circuitry provides the failure event output based upon a plurality of statistical functions.

7. The apparatus of claim 1 wherein the rule is selected from the group consisting of spike, drift, bias, noise and stuck.

8. The apparatus of claim 1 wherein the computing circuitry comprises fuzzy logic and the rule employs a membership function.

9. The apparatus of claim 8 including a fuzzy membership function stored in the memory and wherein computation circuitry applies the membership function to the trained parameter prior to operation of the rule.

10. The apparatus of claim 1 wherein the process signal input comprises a sensor input channel and the process signal comprises a process variable.

11. The apparatus of claim 10 wherein the sensor input channel includes:

a sensor providing a sensor output related to the process; and an analog to digital converter which converts the sensor output into a digitized process variable.

12. The apparatus of claim 11 wherein the sensor is selected from the group consisting of pressure, temperature, pH, flow, turbidity, level sensors, position, conductivity, motor current, motor back emf and vibration.

13. The apparatus of claim 1 wherein the process signal input comprises a control channel and the process signal comprises a control signal.

14. The apparatus of claim 13 wherein the control channel includes:
a control element for controlling the process; and
an actuator for actuating the control element.

15. The apparatus of claim 1 wherein the process signal input comprises input circuitry coupled to the control loop to receive the process signal from the process control loop.

16. The apparatus of claim 1 wherein the output circuitry couples to the process control loop and transmits the failure event output on the process control loop.

17. The apparatus of claim 1 wherein the output circuitry comprises user output circuitry for outputting the failure event output to a user.

18. The apparatus of claim 1 wherein process signal input comprises a diagnostic channel and the process signal comprises a diagnostic signal related to a control element used to control the process.

19. The apparatus of claim 18 wherein the diagnostic signal is selected from the group consisting of valve stem position, force, and pressure.

20. The apparatus of claim 14 wherein the actuator comprises a motor and the control element comprises a pump operated by the motor.

21. The apparatus of claim 1 including an inference engine coupled to the failure event output for performing diagnostics on the process control loop.

22. The apparatus of claim 2 wherein the computing circuitry monitors the current parameter during normal operation of the process control loop and thereby generates the trained parameter.

23. The process control device of claim 1 wherein the trained parameter is related to the process when the process has settled.

24. A transmitter in a process control loop, comprising:
a sensor sensing a process variable;
an analog to digital converter coupled to the sensor having a digitized process variable output;
a memory containing a trained parameter representative of statistical function of an observed process variable and a rule;
computation circuitry coupled to the memory and the analog to digital converter, the computation circuitry calculating a current parameter representative of a statistical parameter of the digitized processed variable, operating on the current parameter based upon the rule and the trained parameter to thereby recognize a pattern in the process signal associated with a failure event and responsively providing a process failure event output; and
output circuitry coupled to the process control loop outputting the process failure event output onto the loop.

25. The transmitter of claim 24 wherein the memory further contains a sensitivity parameter and the failure event output is further based upon the sensitivity parameter.

26. The transmitter of claim 24 wherein the device is completely powered with power received from the process control loop.

27. The transmitter of claim 24 wherein the rule is selected from the group consisting of signal spike, signal drift, signal bias, signal noise and signal stuck.

28. The transmitter of claim 24 wherein the sensor is selected from the group consisting of pressure, pH, flow, turbidity and level sensors.

29. The transmitter of claim 24 including compensation circuitry coupled to the analog to digital converter for compensating the digitized process variable.

30. The transmitter of claim 25 wherein the computing circuitry monitors the current parameter during normal operation of the process control loop and thereby generates the trained parameter.

31. The transmitter of claim 24 wherein the computation circuitry calculates standard deviation and range of the digitized process variable and responsively provides a noise detected output if a current standard deviation is greater than a trained standard deviation times a sensitivity parameter ($\beta$) and if a current range is greater than a trained range.

32. A method performed in a process device for detecting a process failure event in a process control system, comprising:
obtaining a process signal related to a process variable;
retrieving a rule from a memory;
retrieving a trained parameter representative of statistical function of an observed process variable from the memory;
calculating a current parameter representative of a statistical function of the process signal;
comparing current parameter to the trained parameter in accordance with a relationship defined by the rule to thereby recognize a pattern in the process signal associated with a failure event; and
responsively providing a process failure event output based upon the step of comparing.

33. The method of claim 32 including retrieving a sensitivity parameter and where the step of comparing is further based upon the sensitivity parameter.

34. The method of claim 32 wherein the process signal comprises a process variable.

35. The method of claim 32 wherein the process signal comprises a control signal.

36. The method of claim 32 wherein the process signal comprises a diagnostic signal.

37. The method of claim 33 including calculating a current parameter of the process variable during normal operation and storing the current parameter in memory as the trained parameter.

38. The method of claim 32 wherein the rules are selected from the group consisting of spike, drift, bias, noise and stuck.

39. The method of claim 32 wherein the function parameter is selected from the group consisting of standard deviation, mean, sample variance, root-mean-square (RMS), range, and rate of change.

40. The method of claim 32 wherein the step of comparing includes performing a fuzzy logic operation.

41. The method of claim 32 including calculating standard deviation and range of the process signal and responsively providing a noise detected output if a current standard deviation is greater than a trained standard deviation times a noise sensitivity parameter ($\beta$) and if a current range is greater than a trained range.

42. A transmitter coupled to a two wire process control loop which completely powers the transmitter, comprising:

a process signal input providing a process signal related to a process comprising a sensor providing a sensor output related to the process, and an analog to digital converter which converts the sensor output into a digitized process variable;

memory containing a trained parameter representative of statistical function of an observed process signal and a rule;

computing circuitry providing a control signal output as a function of the digitized process variable and calculating a current parameter representative of a statistical function of the digitized process variable and operating on the current parameter and the trained parameter based upon the rule to thereby recognize a pattern in the process signal associated with a failure event and providing a failure event output in response to a failure event in the process detected based upon the operation; and output circuitry outputting the failure event output on the two wire loop.

43. The apparatus of claim 42 wherein the memory further contains a sensitivity parameter and a failure event output is further related to the sensitivity parameter.

44. The apparatus of claim 42 wherein the process control loop is selected from the group consisting of two wire process control loops, three wire process control loops and four wire process control loops.

45. The apparatus of claim 42 wherein the statistical function is selected from the group consisting of standard deviation, mean, sample variance, root-mean-square (RMS), range, and rate of change.

46. The apparatus of claim 42 wherein the computing circuitry provides the event output based upon a plurality of statistical functions.

47. The apparatus of claim 42 wherein the rule is selected from the group consisting of spike, drift, bias, noise and stuck.

48. The apparatus of claim 42 wherein the computing circuitry comprises fuzzy logic and the rule employs a membership function.

49. The apparatus of claim 48 including a fuzzy membership function stored in the memory and wherein computation circuitry applies the membership function to the trained parameter prior to operation of the rule.

50. The apparatus of claim 42 wherein the sensor is selected from the group consisting of pressure, temperature, pH, flow, turbidity, level sensors, position, conductivity, motor current, motor back emf and vibration.

51. The apparatus of claim 42 including an inference engine coupled to the failure event output for performing diagnostics on the process control loop.

52. The apparatus of claim 43 wherein the computing circuitry monitors the current parameter during normal operation of the process control loop and thereby generates the trained parameter.

53. A process device coupled to a process control loop, comprising:

a process signal input for providing a process signal related to a process, the process signal input comprising a control signal for controlling the process;

memory containing a trained parameter representative of statistical function of an observed process signal and a rule;

computing circuitry calculating a current parameter representative of a statistical function of the digitized process variable and operating on the current parameter and the trained parameter based upon the rule to thereby recognize a pattern in the process signal associated with a failure event and providing a failure event output in response to a failure event in the process detected based upon the operation; and output circuitry outputting the failure event output.

54. The apparatus of claim 53 wherein the memory further contains a sensitivity parameter and the failure event output is further based upon the sensitivity parameter.

55. The apparatus of claim 53 wherein the process control loop is selected from the group consisting of two wire process control loops, three wire process control loops and four wire process control loops.

56. The apparatus of claim 53 wherein the device is completely powered with power received from the process control loop.

57. The apparatus of claim 53 wherein the statistical function is selected from the group consisting of standard deviation, mean, sample variance, root-mean-square (RMS), range, and rate of change.

58. The apparatus of claim 53 wherein the computing circuitry provides the failure event output based upon a plurality of statistical functions.

59. The apparatus of claim 53 wherein the rule is selected from the group consisting of spike, drift, bias, noise and stuck.

60. The apparatus of claim 53 wherein the computing circuitry comprises fuzzy logic and the rule employs a membership function.

61. The apparatus of claim 60 including a fuzzy membership function stored in the memory and wherein computation circuitry applies the membership function to the trained parameter prior to operation of the rule.

62. The apparatus of claim 53 including input circuitry coupled to the control loop to receive the process signal from the process control loop.

63. The apparatus of claim 53 wherein the control signal is provided to an actuator comprising a motor thereby actuating a pump.

64. The apparatus of claim 53 including an inference engine coupled to the event output for performing diagnostics on the process control loop.

65. The apparatus of claim 54 wherein the computing circuitry monitors the current parameter during normal operation of the process control loop and thereby generates the trained parameter.

\* \* \* \* \*